US009708829B2

(12) United States Patent
Faigen

(10) Patent No.: US 9,708,829 B2
(45) Date of Patent: Jul. 18, 2017

(54) REFUGE UNIT

(71) Applicant: Philip David Faigen, Ardross (AU)

(72) Inventor: Philip David Faigen, Ardross (AU)

(*) Notice: Subject to any disclaimer, the term of this patent is extended or adjusted under 35 U.S.C. 154(b) by 0 days.

(21) Appl. No.: 15/100,598

(22) PCT Filed: Nov. 17, 2014

(86) PCT No.: PCT/AU2014/001050
§ 371 (c)(1),
(2) Date: May 31, 2016

(87) PCT Pub. No.: WO2015/081366
PCT Pub. Date: Jun. 11, 2015

(65) Prior Publication Data
US 2016/0298353 A1    Oct. 13, 2016

(30) Foreign Application Priority Data

Dec. 5, 2013    (AU) ................ 2013904730

(51) Int. Cl.
*E04H 9/16*    (2006.01)
*E04H 9/14*    (2006.01)
(Continued)

(52) U.S. Cl.
CPC ............. *E04H 9/16* (2013.01); *B63B 29/12* (2013.01); *B63C 9/06* (2013.01); *E04H 9/14* (2013.01);
(Continued)

(58) Field of Classification Search
CPC .. E04H 9/16; E04H 9/145; E04H 9/14; E04B 1/35; E04B 1/94; E05F 15/72; B63C 9/06;
(Continued)

(56) References Cited

U.S. PATENT DOCUMENTS 1,577,475 A * 3/1926 Liska ................. B63C 9/06
114/350
3,044,082 A * 7/1962 Gordon ................. B63C 9/06
114/350
(Continued)

FOREIGN PATENT DOCUMENTS

CA    2141895 A1    8/1996
CA    2209039 A1    1/1999
(Continued)

OTHER PUBLICATIONS

International Search Report in PCT/AU2014/001050 dated Jan. 15, 2015, 3 pages.
(Continued)

*Primary Examiner* — Andrew J Triggs
(74) *Attorney, Agent, or Firm* — Foley & Lardner LLP

(57) ABSTRACT

A refuge unit has an outer structure and an inner structure. The inner structure is rotatable relative to the outer structure about an axis of rotation. The inner structure is capable of accommodating one or more people. The inner structure is biased toward a substantially constant rotational position about the axis such that if the axis lies in horizontal plane, a floor of the inner structure also lies in a horizontal plane. One or more doors are provided at respective opposite entrances to the unit.

17 Claims, 6 Drawing Sheets

(51) Int. Cl.
  *B63C 9/06* (2006.01)
  *B63B 29/12* (2006.01)
  *B63C 9/04* (2006.01)
  *B63C 9/02* (2006.01)

(52) U.S. Cl.
  CPC .. *B63C 2009/023* (2013.01); *B63C 2009/026* (2013.01); *B63C 2009/046* (2013.01)

(58) Field of Classification Search
  CPC ........ B63C 2009/023; B63C 2009/026; B63C 2009/046; B63B 29/12
  See application file for complete search history.

(56) References Cited

U.S. PATENT DOCUMENTS

| | | | |
|---|---|---|---|
| 4,174,711 A | 11/1979 | Laing et al. | |
| 4,267,614 A * | 5/1981 | Anderson | B63C 9/06 441/87 |
| 5,921,388 A | 7/1999 | Petrilli et al. | |
| 6,342,004 B1 * | 1/2002 | Lattimore | A62C 3/16 169/48 |
| 2005/0136760 A1 | 6/2005 | Anderson et al. | |
| 2016/0298353 A1 * | 10/2016 | Faigen | E04H 9/14 |

FOREIGN PATENT DOCUMENTS

| | | |
|---|---|---|
| DE | 32 14213 A1 | 10/1983 |
| EP | 0 114 906 A1 | 8/1984 |
| JP | H08276894 A1 | 10/1996 |
| JP | 3752516 B1 | 3/2006 |

OTHER PUBLICATIONS

Written Opinion of the International Searching Authority in PCT/AU2014/001050 dated Jan. 15, 2015, 5 pages.

* cited by examiner

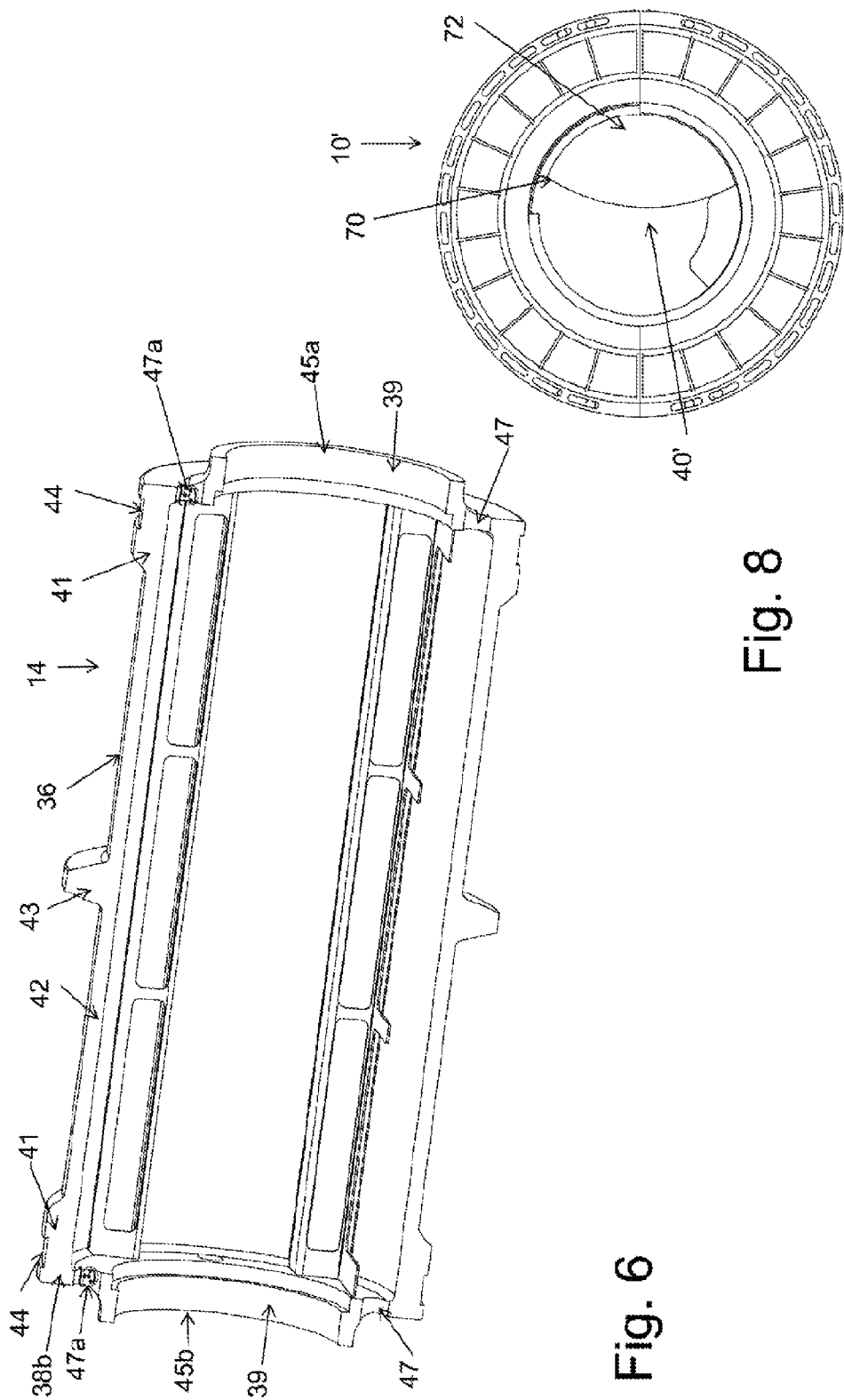

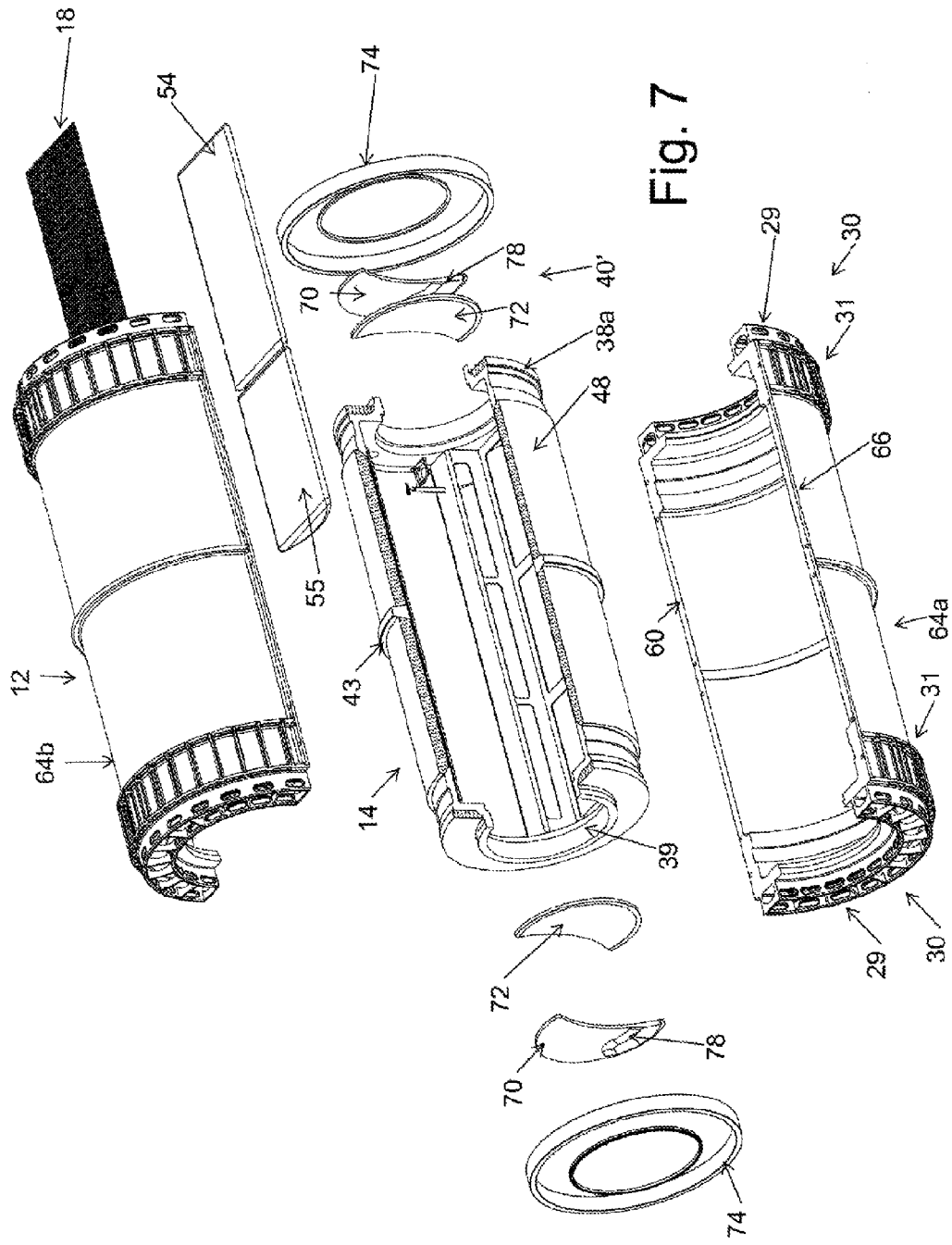

REFUGE UNIT

CROSS REFERENCE TO RELATED APPLICATIONS

The present application is a U.S. National Stage of International Application No. PCT/AU2014/001050 filed on Nov. 17, 2014, which claims the benefit of Australian Patent Application No. 2013904730 filed on Dec. 5, 2013, the entire disclosures of all of which are incorporated herein by reference.

TECHNICAL FIELD

A refuge unit is disclosed for accommodating one or more people. In particular, though not exclusively, the disclosed refuge unit may have application as a temporary accommodation that can be deployed as required. For example the unit may provide shelter or refuge to people in dangerous situations or conditions such as in bushfires, floods or other natural or man-made disaster conditions.

BACKGROUND ART

There have been many tragedies around the world where fire fighters and members of the public have lost their lives during the course of fighting bush fires. In some instances, fire fighters have sought shelter in their vehicles when trapped by fire, for example due to unexpected wind shifts. However most fire fighting vehicles are not adapted to provide safe refuge when overrun by fire.

The above reference to the background art is not intended to limit application of the refuge unit as disclosed herein. For example embodiments of the disclosed refuge unit may be used as temporary refuge or accommodation for workers at remote locations or for persons in vulnerable situations such as floods, cyclonic conditions or landslides.

SUMMARY OF THE DISCLOSURE

In one aspect there is disclosed a refuge unit comprising:
an outer structure and an inner structure disposed inside the outer structure, the inner structure being rotatable relative to the outer structure about an axis of rotation;
wherein the inner structure is capable of accommodating one or more people and is biased toward a substantially constant rotational position about the axis of rotation.

In one embodiment the inner structure is, or is capable of being, weighted so that a centre of gravity of the inner structure is radially offset from the axis of rotation to thereby bias the inner structure to the substantially constant rotational position.

In one embodiment the inner structure is provided with one or more ballast tanks capable of holding a ballast material in a manner wherein the ballast material biases the inner structure toward the substantially constant rotational position.

In one embodiment the refuge unit comprises ballast material held within the one or more ballast tanks.

In one embodiment the ballast material is water.

In one embodiment the refuge unit comprises one or more rotational devices arranged to facilitate rotation of the inner structure relative to the outer structure, the rotational device is being disposed between the inner structure and the outer structure. The rotational devices may be in the form of bearings, rollers or other mechanisms; or materials that provide minimal friction between the inner and outer bodies.

In one embodiment the one or more rotation devices comprise a plurality of rotational devices.

In one embodiment the refuge unit comprises a thermal insulator disposed between the inner and outer structures.

In one embodiment the thermal insulator in the void is air.

In one embodiment the refuge unit comprises two entrances and at least one door at each entrance.

In one embodiment the refuge unit comprises a respective inner door and an outer door at each of the entrances.

In one embodiment the outer doors and the inner doors at a common entrance are arranged to remain in substantial axial alignment independent of a rotational position of the inner structure relative to the outer structure.

In one embodiment at least one of the doors comprises two or more leafs arranged to rotate relative to each other, while remaining parallel to each other, between a closed position where the leafs cooperate to close a corresponding entrance to the refuge unit and an open position where leafs uncover a portion of the corresponding entrance to enable passage through that entrance.

In one embodiment the refuge unit comprises an omnidirectional ladder extending about each entrance and configured to enable a person to climb onto the outer structure to reach the outer door independent of a rotational position of the outer structure about the axis of rotation.

In one embodiment the refuge unit comprises a planar floor supported within the inner structure and wherein the substantially constant rotational position of the inner structure is a position where planar floor lies substantially in a horizontal plane and below the axis of rotation when the axis of rotation lies in a horizontal plane.

In a second aspect there is disclosed a refuge unit comprising an outer structure and an inner structure, the inner structure disposed within the outer structure and wherein the inner structure is rotatable relative to the outer structure;
the inner structure being capable of accommodating one or more people; and
a thermal insulator provided between an outer circumferential surface of the inner structure and an inner circumferential surface of the outer structure.

In one embodiment the outer structure is made of a fire proof material.

In one embodiment the refuge unit comprises a heat reflective layer on the outer surface of the outer structure.

In one embodiment the refuge unit comprises one or more floatation devices or fenders coupled to the outer structure.

DESCRIPTION OF THE DRAWINGS

Notwithstanding any other forms which may fall within the scope of the refuge unit as set forth in the Summary, specific embodiments will now be described, by way of example only, with reference to the accompanying drawings in which:

FIG. 6 is a longitudinal section view of an inner structure incorporated in the refuge shown in FIG. 1;

FIG. 7 is an exploded view of a second embodiment of the disclosed refuge unit; and, FIG. 8 is an end view of the second embodiment of the refuge unit shown in FIG. 7.

DETAILED DESCRIPTION OF PREFERRED EMBODIMENT

Figure 1:
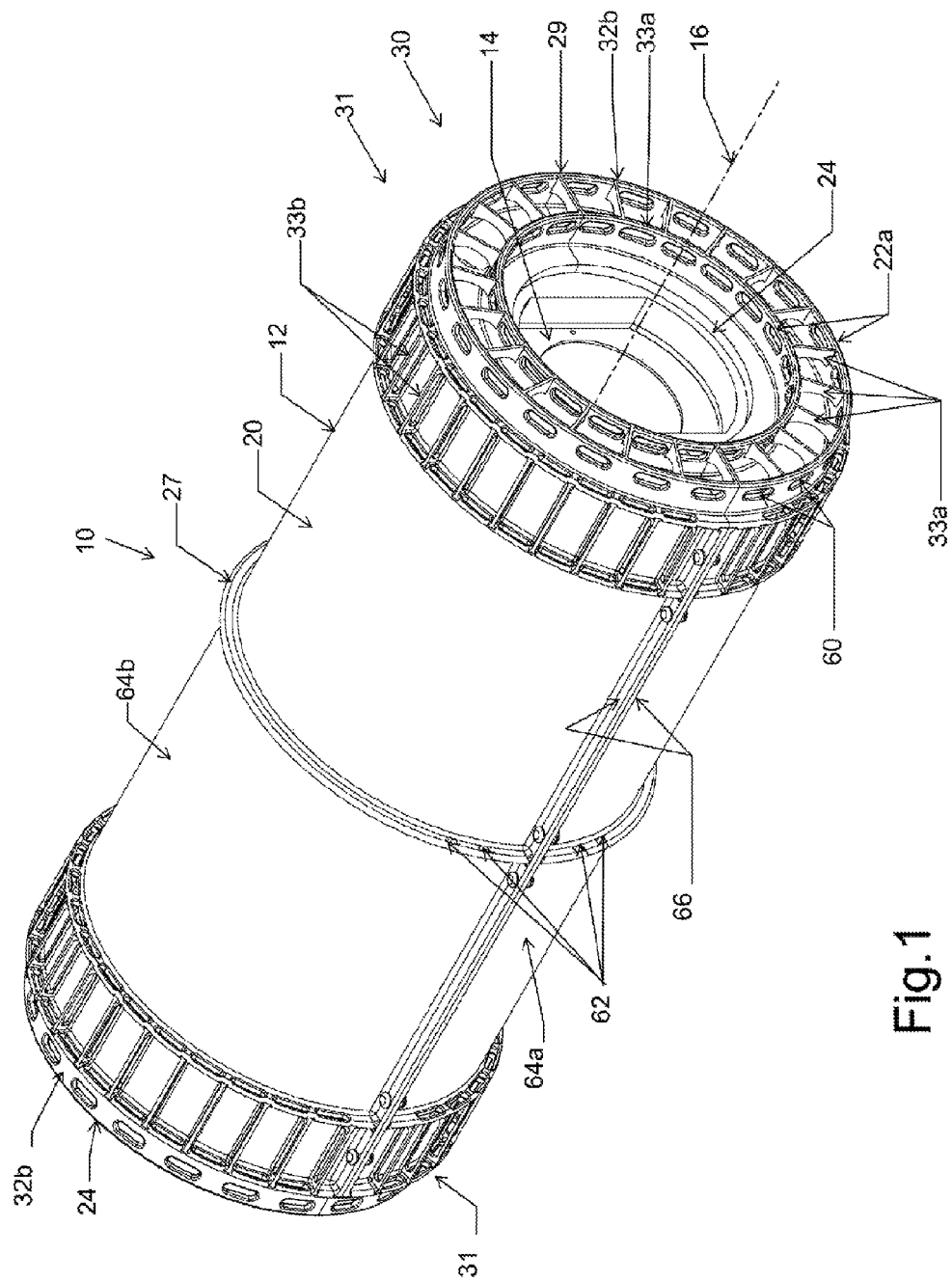
FIG. 1 is an isometric view of one embodiment of the disclosed refuge unit.
Figure 2:
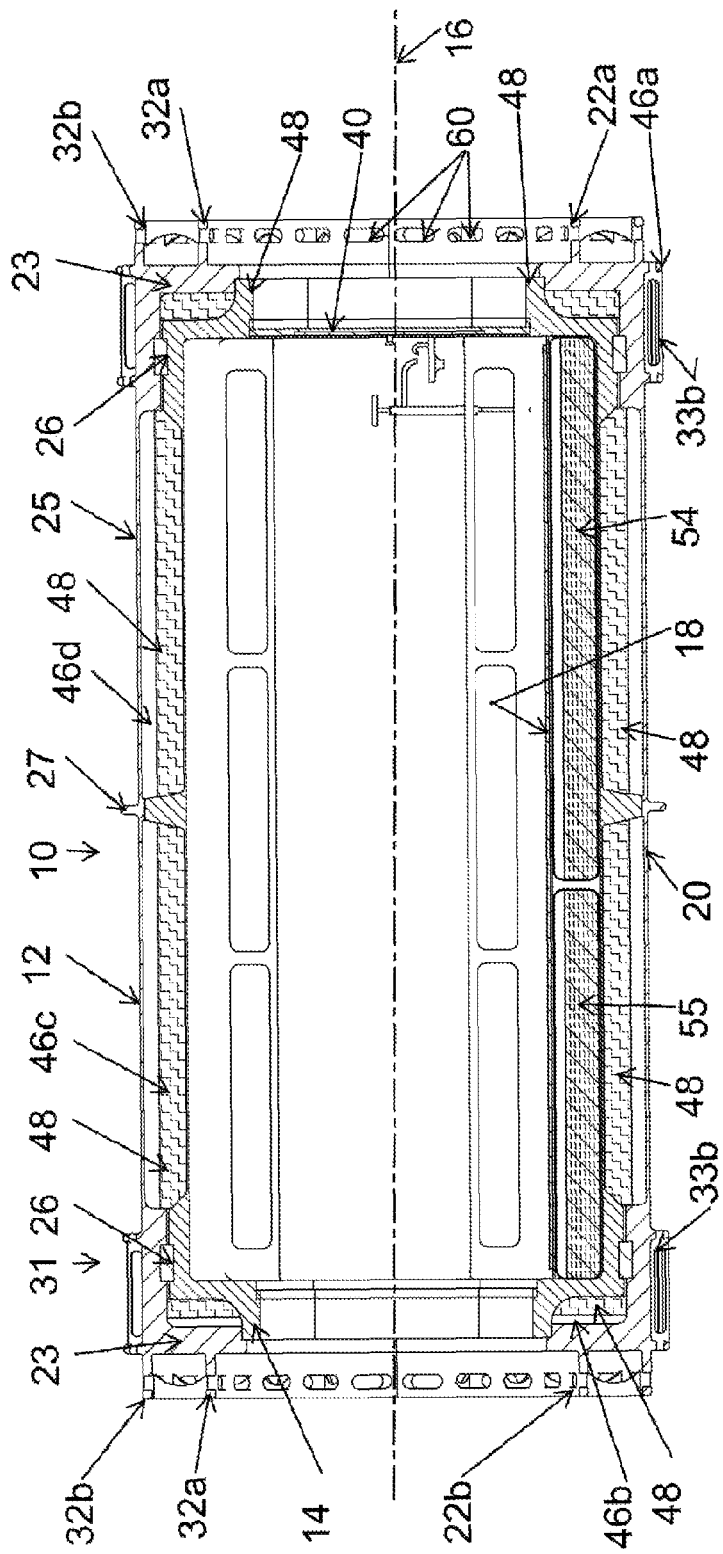
FIG. 2 is a longitudinal section view of the refuge unit shown in FIG. 1.

FIGS. 1-6 depict a first embodiment of the refuge unit (10). The refuge unit (10) comprises an outer structure (12) and an inner structure (14). The inner structure (14) is disposed within the outer structure (12). Further, the inner structure (14) is rotatable relative to the outer structure (12) about an axis of rotation (16). The inner structure (14) is capable of accommodating one or more people. For example the inner structure (14) may be configured so that an adult male of average height can stand fully upright inside the inner structure (14).

The inner structure is biased toward a substantially constant rotational position about the axis (16). This constant position is depicted in each of FIGS. 1-4. A convenient way of denoting this constant rotational position is to consider the orientation of a planar floor (18) fitted within the inner structure (14). When the axis (16) lies in horizontal plane, the constant rotational position of the inner structure (14) is denoted by the floor (18) also lying in a horizontal plane. Thus, irrespective of the rotational position of the outer housing (12), the inner structure (14) is biased towards a position where the floor (18) lies in horizontal plane provided of course that the axis (16) is also in a horizontal plane. For example, if the unit (10) were to be rolled along a horizontal surface then notwithstanding the rolling of the outer structure (12) on the surface, the unit (10) is designed so that the rotational position of the inner structure (14) is biased to urge the floor (18) to lie in a substantially horizontal plane.

The floor (18) in this embodiment is in the form of a light weight metal or fibreglass mesh. However it may take other forms such as but not limited to one or more fibre cement, or wooden boards.

It is envisaged that in many applications the unit (10) may be disposed so that the axis (16) is not in a horizontal plane. For example the unit (10) may be deployed on a hill or may have one end elevated on a mound so that the axis (16) is inclined. In this orientation the inner structure (14) is biased so the floor (18) lies in a plane that disposes the floor (18) in its lowest possible gravitational position. To provide context, unit (10) may be temporarily or permanently located in a selected position or may be deployed for example by helicopter in bushland to provide a safe haven for fire fighters or other personnel in the event of a bush fire. When initially deployed by a mobile vehicle such as land vehicle or helicopter, the unit (10) may indeed roll for some distance before coming to rest and may be orientated so that the axis (16) lies in a plane inclined to the horizontal. Nevertheless the inner structure (14) will be biased toward the aforementioned substantially constant rotational position. The rotational biasing of the inner structure (14) is in effect a self-righting feature or characteristic of the inner structure (14).

In this embodiment both the outer structure (12) and inner structure (14) are both of substantially cylindrical configurations. The outer structure (12) comprises a cylindrical wall (20) and opposite radial walls (22a and 22b). A central opening or entrance (24) is formed in each of the radial walls (22a, 22b) to enable entry to and exit from the inner structure (14). Vent openings (19) are also provided in the radial walls (22a, 22b). The openings (24) also constitute respective entrances to the unit (10). The circumferential wall (20) has a thickened band (23) adjacent each of the radial walls (22a, 22b). A thinner shell (25) extends between the thickened bands (23). A circumferentially bearing seats (26) is formed on an inside surface of the circumferential wall (20) in each of the thickened bands (23). A circumferential strengthening rib (27) is provided about an outer surface (28) of the circumferential wall (20). The rib (27) is in a radial plane midway along the axis (16).

An omni-directional circular ladder (30) is provided about each of the radial walls (22a and 22b). The omni-directional ladder (30) comprises first and second ladder structures 29 and 31. The first ladder structure (29) is in the form of two concentric circular steps (32a and 32b) that protrude in the axial direction from the radial walls (22a, 22b). Rungs or handles (33a) extend between the radial walls (22a and 22b). The steps (32a and 32b) enable a person to climb up the radial wall (22a or 22b). The second ladder structure (31) comprises a plurality of rungs (33b) that extend about the radial walls (22a, 22b) on the outer surface (25) of the outer structure (12). The first and second ladder structures are adjacent each other at each of the ends of the unit (10) so that a person can easily climb from one to the other at the same end.

Figures 3, 4:
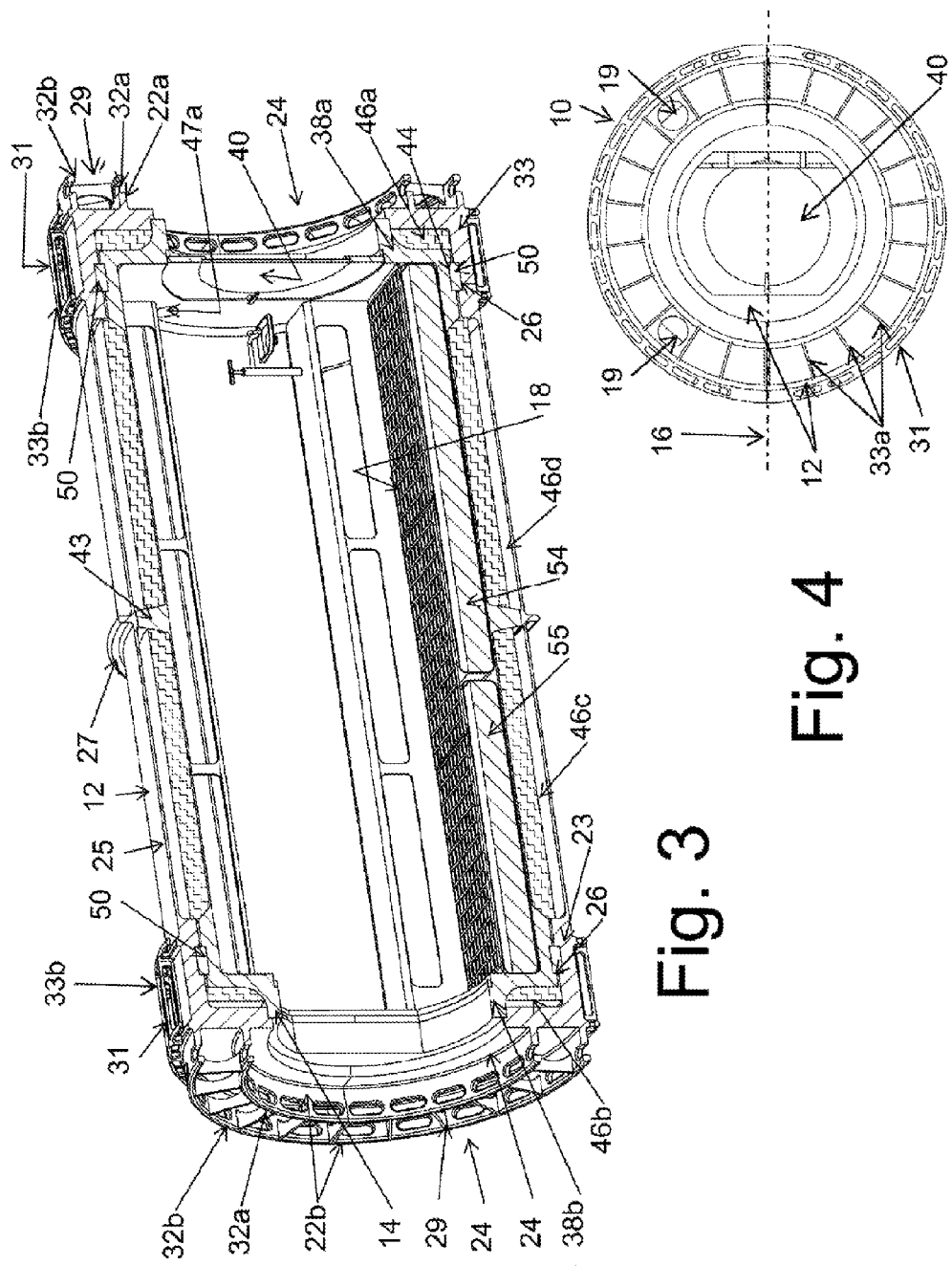
FIG. 3 is an isometric longitudinal section view of the refuge unit shown in FIG. 1.
FIG. 4 is an end view of the refuge unit shown in FIG. 1.
Figure 5:
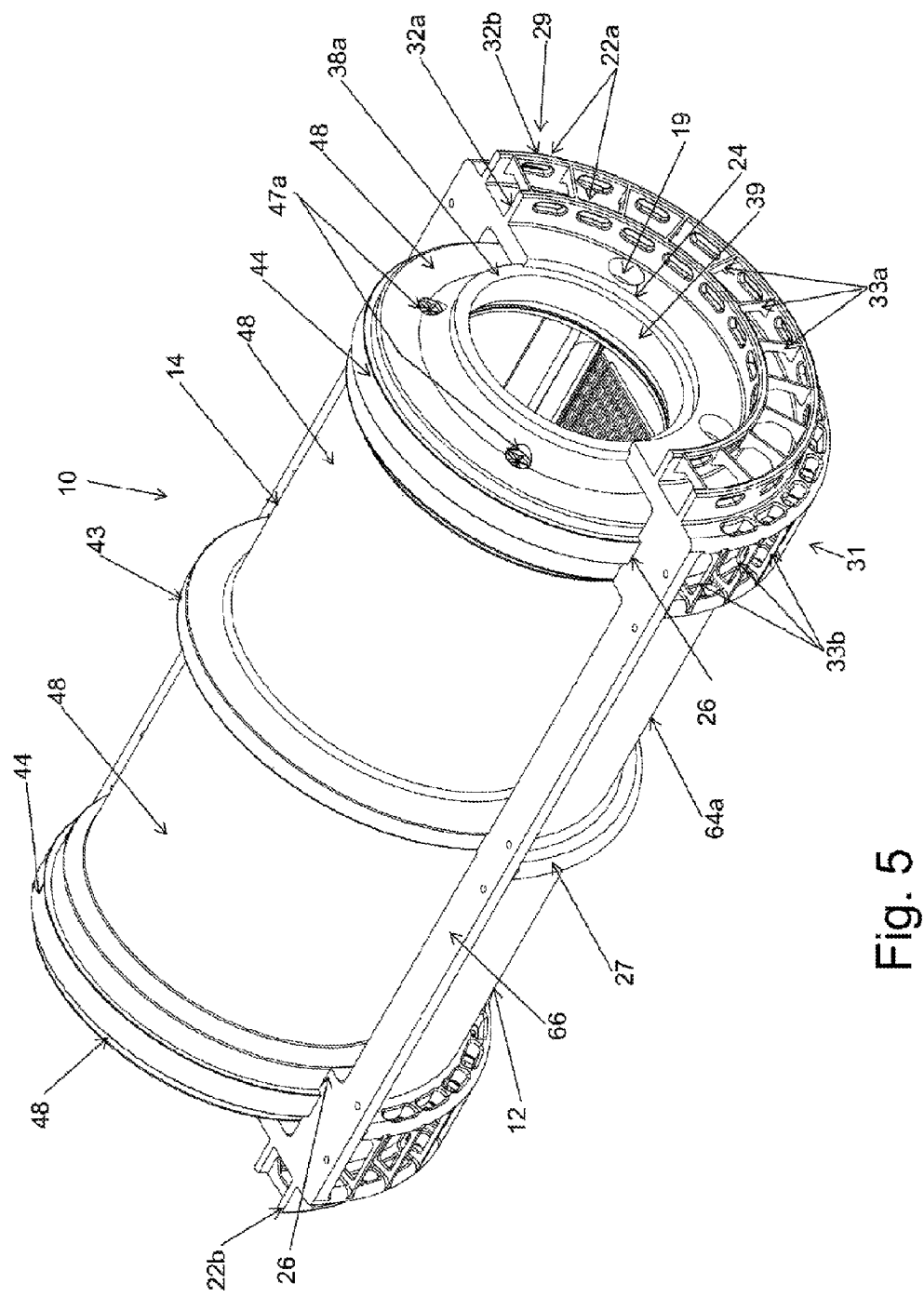
FIG. 5 is a partially disassembled view of the refuge unit shown in FIG. 1.

With particular reference to FIGS. 3, 5 and 6 the inner structure (14) comprises a cylindrical wall (36) and two radial opposite walls (38a and 38b). A central opening (39) is defined by each of the radial walls (38a, 38b) for fitting of a respective door (40). In this embodiment the door (40) is a hinged door that opens inward of the inner structure (14). While a door (40) is shown only in the radial wall (38a), another door is fitted to the opposite radial wall (38b).

The circumferential wall (36) is formed with thickened end portions (41) and an intervening thinner shell (42). A circumferential bearing surface (43) extends about the cylindrical wall midway along the central axis (16). A bearing seat (44) is formed in each of the thickened end portions (41). The radial walls (38a, 38b) have respective circumferential wall (45a, 45b) that project in an axial direction and create the openings (39). Vent openings (47) are provided in each of the radial walls (38a, 38b). Electric or battery operated fans (47a) can be fitted in the openings (47).

Air is able to enter the inner structure (14) when the doors (40) at each end are closed by way a flow path that comprises the vent openings (19), the space or air gap between the inner and outer structures (12, 14) and the vents (47 or 47a). Shutters (not shown) can be provided to shut or seal the vent opening (19) in certain circumstances. One such circumstance includes when a fire is in the immediate vicinity of the unit. Sensors may be provided to automatically close the vents (19). Alternately manually operable shutters can be provided. Another circumstance is when the unit is deployed in a body of water. In that instance the shutters can operate on at least the lowest of the vent openings 19 to prevent or stem inflow of water. A pump similar to a bilge pump may also be provided to pump out water flowing into the space between the inner and outer structures (12, 14).

As is clearly evident from the accompanying Figures the inner and outer structures (12 and 14) are relatively dimensioned and juxtaposed so as to form a plurality of intervening voids or spaces (46a, 46b, 46c and 46d) (hereinafter referred to in general and collectively as "space (46)" or "spaces (46)". The space (46) includes one end portion (46a) between the radial walls (22a and 38a); one end portion (46b) between the radial walls (22b and 38b); and two annular portions (46c and 46d) between the respective cylindrical walls (20 and 36).

A thermal insulator may be disposed within the space (46) between the outer and inner structures (12, 14). In the simplest configuration the insulator may be air. That is the thermal insulator is in the form of an air gap or space between the outer structure (12) and the inner structure (14). In other embodiments, the thermal insulator may comprise a combination of an air gap and one or more layers of a thermal insulator material (48) such as a ceramics material or foam or other specialty insulation materials coupled otherwise attached to the one or both of: an inner surface of the cylindrical wall (20) and an outer surface of the cylindrical wall (36) in the spaces (46c and 46d); as well as one or more of the inner surfaces of the radial walls (22a, 22b) and the outer surfaces of the radial walls (38a and 38b) in the spaces (46a and 46b).

An annular bearing (50) is partially seated in each of the opposed bearing seats (26 and 44) (see for example the bottom right hand corner of FIG. 3). The bearing (50) may for example be in the form of a PTFE ring. The bearings facilitate the relative rotation between the inner and outer structures (12, 14). The intermediate bearing (43) is in radial alignment with the rib (27) and able to run along the inside of the shell (25) and provide structural rigidity to the unit (10).

A ballast tank (54) is formed in the inner structure (14) between the floor (18) and an inner circumferential surface of the wall (36). The tank (54) may be provided with a number of internal baffles to dampen "wave wash" or indeed may be comprised of a number of separate portions or sub-tanks in order to assist in weight distribution. In use, the ballast tank (54) can be filled with a ballast material such as water. One purpose of the ballast material is to weigh the inner structure (14) so that its centre of gravity is radially offset from the axis (16). In this way, the inner structure (14) is biased or weighted so as to rotate to the previously described substantially constant rotational position about the axis (16). The water may also be potable and thus useable for human consumption.

A waste liquid storage tank (55) is also provided within the inner structure (14) beneath the floor (18). The unit (10) may also be arranged so that at least some of the potable water or waste liquid can be pumped to spray the exterior surface of the structures (12) or indeed a small area around the unit (10).

The inner structure (14) is also provided with internal seats (56) and overhead storage facilities (58). The seat (56) and storage facilities (58) may be moulded integrally with the cylindrical wall (36). Alternately the seats (56) and storage facilities (58) can be fabricated separately and subsequently installed in the structure (14). The seats (56) are configured to create further storage space between the inner circumferential surface of the wall (36).

A plurality of holes (60) is formed in the circular steps (32 and 34). Additional holes (62) are provided in the rib (27). The holes (60, 62) are provided to enable the coupling of lifting lugs, floatation devices, fenders, ropes, anchors or guy wires for semi-permanent locating of the unit and/or other structure and objects. This enables for example the unit (10) to be lifted and deployed by helicopter or by a land vehicle particularly one fitted with a hoist. The attachment of fenders provides a degree of impact protection in the event that the unit (10) is dropped onto the ground. Attaching floats to the holes (60) enable the unit to be used in the water for example as a refuge for workers on an offshore platform or persons in a flooded area.

The holes (60, 62) also enable the coupling of membrane materials or sheets such as tents or tarpaulins. These may be deployed should the occupants require or desire external shelter after the immediate conditions which necessitated use of the unit (10) have abated. The membrane or sheet materials can be stored in spaces under the seats (56) as well as other essential survivals equipment.

The outer and inner structures (12 and 14) may be made from a glass reinforced lightweight cementitious material. This may be particularly beneficial when the refuge unit (10) is to be used as emergency sanctuary to provide protection in the case for example of bush fire. The outer surface (28) of the cylindrical wall (20) can be provided with a heat reflective coating such as an aluminium foil, reflective paint, or materials such as magnesium oxide. However, if fire resistance is not required for example when the refuge unit (10) is used as temporary sanctuary in flood prone areas, then the structures (12 and 14) may be made from other materials such as plastics including but not limited to polycarbonate, neoprene, HDPE (high density polyethylene), metals, or composite materials.

As seen in FIGS. 1 and 5 the outer structure (12) can be made as two semi-cylindrical halves (64a, 64b). Each half has a pair of diametrically opposed axially extending flanges (66). The two halves (64a, 64b) are fastened together along the flanges (66). The inner structure (14) can be formed as a single piece and lowered into one of the halves (64a) prior to fastening of the other half (64b).

It is envisaged that the inner structure (14) will be further fitted with amenities for short term survival including for example: a hand water pump or pumps coupled with a wash basin, electronic equipment such as a radio and/or or satellite telephone, electrical power source such as batteries including solar or manually rechargeable batteries, lighting, a chemical toilet, and air filtration and/or conditioning equipment including air scrubbers for removing $CO_2$, air tanks and radio beacons.

FIG. 7 is an exploded view of a second embodiment of the unit (10). In this embodiment the same reference numbers are used to denote the same features as in the first embodiment shown in FIGS. 1-6. The only difference between the embodiments of the units (10 and 10') is the construction and operation of the respective doors. In the unit (10') a split rotating door structure (40') is used in place of the hinged door (40) of the unit (10).

The door structure (40') comprises two door leaves (70) and (72). The door structure (40') also includes a bearing ring (74 which is fixed to the opening (39) in each of the radial walls (38a) and (38b). Each of the leaves (70) and (72) is in the form of a circular disc with a crescent shape cut out. The respective cut outs are of an area such that two leaves (70) and (72) can be arranged in one juxtaposition where they partially overlap each other and together completely close off the opening (39). However one of the leaves can be rotated relative to the other while remaining parallel to each other to uncover a portion of the opening (39) enabling passage through the opening (39). For example, the leaf (72) may be fixed within the ring (74) but the leaf (70) may be rotatable about the axis (16) within the bearing ring (74). Thus by rotating the leaf (70) about the bearing ring (74) the opening (39) can be completely shut or partially opened. The leaf (70) may be weighted for example by provision of a thickened portion (78) so as to rotate by action of gravity back to a closed position after it has been rotated away from the closed position.

Whilst embodiments have now been described, it should be appreciated that the refuge may be embodied in many other forms. For example, in the present embodiments only a single door/door structure (40/40') is provided at each opposite end of the unit (10). However a dual door arrangement can be provided at each end. For example in addition to the doors (40/40') a further door may be fitted to each of the radial walls (22a) and (22b) of the outer structure (10). Conveniently such doors can be in the form of the rotating door structures (40') described in relation to the unit (10') in FIG. 7. It is also possible to have both door types in a single unit (10) or (10'). For example if two doors are fitted at each end of the unit (10, 10') then the outer most door on the radial walls (22a) and (22b) may be in the form of the rotating door structures (40') while doors fitted to the radial walls (38a) and (38b) of the inner structure (14) may be in the form of hinge doors (40).

Also the present embodiment describes the use of bearings and bearing surfaces to facilitate relative rotational motion of the inner and outer structures (12) and (14). However other arrangements are possible such as for example the provision of rollers or ball bearings. Further, the units (10, 10') may be made to various dimensions. In one possible arrangement the units (10, 10') may have a diameter of 3 m and a length of 6.5 m. However the length dimensions in particular can be varied and moreover shorter units for example of a length of around 3-3.5 m can be made. Irrespective of their length, the units (10, 10') may also be formed so as to be connected together axially in an end to end manner.

The unit (10/10') can be readily adapted to meet a multitude of other disaster situations such as but not limited to nuclear fallout, poisonous gas or biological attack by appropriate selection of construction materials, or use of other barrier layers instead of or in addition to the thermal insulating material (48); gas tight sealing; and an air supply or air scrubbing equipment. For example either or both of inner and outer structures (12, 14) and the doors (40) may be provided with a lead lining to provide protection against nuclear radiation.

In the claims which follow, and in the preceding description, except where the context requires otherwise due to express language or unnecessary implication, the word "comprise" and variations such as "comprises" or "comprising" are used in an inclusive sense, i.e. to specify the presence of the stated features but not to preclude the presence or addition of further features in various embodiments of the refuge unit as disclosed herein.

The invention claimed is:

1. A refuge unit comprising:
   an outer cylindrical structure and an inner cylindrical structure disposed inside the outer cylindrical structure, the inner cylindrical structure being rotatable relative to the outer cylindrical structure about an axis of rotation;
   the outer cylindrical structure having openings at respective axially opposite ends, the inner cylindrical structure having two doors one of each at respective axial ends of the inner cylindrical structure and aligned with a respective one of said openings, wherein the axis of rotation passes through all of the openings and the doors, the doors being arranged to enable entry to an inside of the inner cylindrical structure;
   wherein the inner cylindrical structure is capable of accommodating one or more people and is biased toward a substantially constant rotational position about the axis of rotation and wherein the unit is configured to enable it to roll on the ground about the axis of rotation.

2. The refuge unit according to claim 1 comprising at least one vent opening formed in a radial wall of the outer cylindrical structure and an air gap between the inner and outer cylindrical structures wherein air is able to enter the inner cylindrical structure when the doors are closed by way of a flow path that comprises the at least one vent openings and the air gap.

3. The refuge unit according to claim 2 comprising shutters operative to enable the at least one vent opening to be shut or sealed.

4. The refuge unit according to claim 3 comprising sensors arranged to operate the shutters to automatically close the at least one vent opening when a fire is in the immediate vicinity of the unit.

5. The refuge unit according to claim 1, wherein the inner cylindrical structure is, or is capable of being, weighted so that a centre of gravity of the inner cylindrical structure is radially offset from the axis of rotation to thereby bias the inner cylindrical structure to the substantially constant rotational position.

6. The refuge unit according to claim 5, wherein the inner cylindrical structure is provided with one or more ballast tanks capable of holding a ballast material in a manner wherein the ballast material biases the inner cylindrical structure toward the substantially constant rotational position.

7. The refuge unit according to claim 6 comprising ballast material held within the one or more ballast tanks, and wherein the ballast material is water.

8. The refuge unit according to claim 1, comprising one or more bearings arranged to facilitate rotation of the inner cylindrical structure relative to the outer structure, the bearings being disposed between the inner cylindrical structure and the outer structure.

9. The refuge unit according to claim 1, wherein an inner surface of the outer cylindrical structure is spaced from an outer surface of the inner cylindrical structure thereby forming a void between the inner cylindrical structure and the outer cylindrical structure.

10. The refuge unit according to claim 9, comprising a thermal insulator disposed in the void.

11. The refuge unit according to claim 10, wherein the thermal insulator in the void is air.

12. The refuge unit according to claim 10, wherein the thermal insulator in the void is a solid material.

13. The refuge unit according to claim 10, wherein the thermal insulator comprises one or more layers of a solid material and one or more air gaps.

14. The refuge unit according to claim 1, comprising an omni-directional ladder extending about each of the openings and configured to enable a person to climb onto the outer cylindrical structure to reach the one of the doors independent of a rotational position of the outer cylindrical structure about the axis of rotation.

15. The refuge unit according to claim 1, comprising a planar floor supported within the inner cylindrical structure and wherein the substantially constant rotational position of the inner cylindrical structure is a position where the planar floor lies substantially in a horizontal plane and below the axis of rotation when the axis of rotation lies in a horizontal plane.

16. The refuge unit according to claim 1, comprising a heat reflective layer on the outer surface of the outer cylindrical structure.

17. The refuge unit according to claim 1, wherein the refuge unit is a fire refuge unit and wherein the outer cylindrical structure is made of a fire proof material or other non-flammable product.

* * * * *